United States Patent [19]

Weinhold

[11] Patent Number: 4,695,079

[45] Date of Patent: Sep. 22, 1987

[54] DEVICE FOR CONNECTING THE ENDS OF TWO PIPES

[76] Inventor: Karl Weinhold, Im Jagdfeld 43, D 4040 Neuss, Fed. Rep. of Germany

[21] Appl. No.: 792,953

[22] Filed: Oct. 30, 1985

[30] Foreign Application Priority Data

Nov. 3, 1984 [DE] Fed. Rep. of Germany ....... 3440259

[51] Int. Cl.$^4$ .............................................. F16L 27/04
[52] U.S. Cl. ..................................... 285/278; 285/39; 285/364; 285/406
[58] Field of Search ...................... 285/13, 14, 39, 175, 285/278, 280, 281, 364, 405, 406

[56] References Cited

U.S. PATENT DOCUMENTS

| 633,324 | 9/1899 | Luke | 285/175 |
| 1,509,562 | 9/1924 | Macgregor | 285/280 |
| 2,333,243 | 11/1943 | Glab | 285/406 |
| 3,653,115 | 4/1972 | Perkins | 29/237 |
| 4,252,347 | 2/1981 | Weinhold | 285/175 |
| 4,463,972 | 8/1984 | Weinhold | 285/364 |

FOREIGN PATENT DOCUMENTS

| 42489 | 2/1938 | Netherlands | 285/39 |
| 74867 | 6/1954 | Netherlands | 285/364 |
| 953501 | 3/1964 | United Kingdom | 285/39 |
| 658351 | 4/1979 | U.S.S.R. | 285/39 |

Primary Examiner—Cornelius J. Husar
Assistant Examiner—Anthony Knight
Attorney, Agent, or Firm—Sprung Horn Kramer & Woods

[57] ABSTRACT

A device for connecting the ends of two pipes and comprising an insert and a bushing that slides over the end of one pipe, that the insert fits into, and that has a rear face extending inward at the end toward the insert and overlapping an outside annular ridge on the end of the pipe. To facilitate removing contamination from the connection, the rear face has at least one bore therein.

5 Claims, 1 Drawing Figure

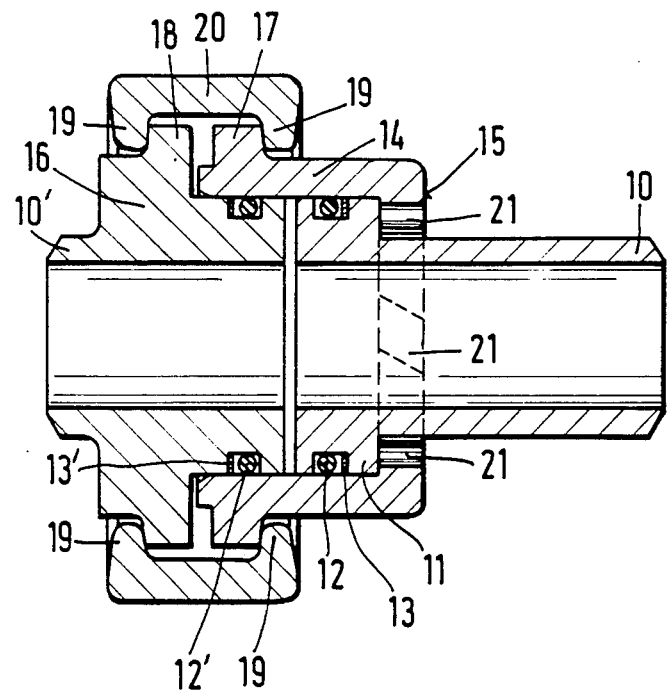

DEVICE FOR CONNECTING THE ENDS OF TWO PIPES

BACKGROUND OF THE INVENTION

The present invention relates to a device for connecting the ends of two pipes and comprising an insert and a bushing that slides over the end of one pipe, that the insert fits into, and that has an annular mount extending inward at the end toward the insert and overlapping an outside annular ridge on the end of the pipe.

The insert and bushing in a device of this type are usually held together by a multipart clip that can be secured with a tensioning-lever closure. The advantage of a bushing, which is accordingly not rigidly connected to its associated pipe end, is that the connection between the ends of the two pipes can be established or released without the ends having to be moved together axially.

Devices of this type are often exposed to a lot of contamination. In underground structures, for example, dirt can penetrate inside the bushing after quite a while and settle between the annular mount of the slide-on bushing's and the outside annular ridge of the associated pipe.

It is relatively difficult to remove this dirt when the bushing cannot be completely slid over the end of the pipe and the ridge completely exposed. The length of slide is frequently limited by a seam produced by welding part of a pipeline to the connection that has the annular ridge. Contamination that has settled between the annular mount on the bushing and the annular ridge on the end of the pipe can also prevent the insert and bushing from sliding far enough together to allow the cups to be mounted and the insert and bushing to be connected. The contamination must accordingly be removed when too much has accumulated even though it is difficult and time-consuming for the aforesaid reasons.

SUMMARY OF THE INVENTION

The object of the present invention is to provide a device of the aforesaid type in which contamination between the bushing and the associated end of the pipe can be removed from as easily as possible.

This object is attained in accordance with the invention in a device of the aforesaid type wherein the annular mount has at least one bore in its rear face.

The invention exploits the recognition that, when the slide-on bushing and the end of the pipe are rotated relative to each other, the particles of contamination between the annular ridge on the end of the pipe and the annular mount on the bushing will be forced into the bore or bores and will either emerge by itself or can be removed. Generally, only a few rotations will be necessary to remove at least enough dirt to allow the insert and bushing to be unobjectionably connected.

To allow the contamination to be removed as completely as possible by this method, the bore in one practical embodiment of the invention extends over at least most of the radius of the annular mount. Thus, the total radius of the annular contact surface between the mount and the ridge will be exposed as extensively as possible to the cleaning process.

The bore can be either a hole or a slot—a recess, that is, that opens toward the inside of the annular mount. It will be an advantage to have at least two or even more bores in the annular mount, and it is recommended that they be distributed as evenly as possible around the rear face.

The bore can extend inside a surface in the vicinity of the bore at an angle opposed to one of the two possible directions of rotation.

A preferred embodiment of the invention will now be described with reference to the attached drawing, wherein:

BRIEF DESCRIPTION OF THE DRAWING

The FIGURE which is a longitudinal section through a device in accordance with the invention.

DETAILED DESCRIPTION OF THE PREFERRED EMBODIMENTS

The end 10 of a pipe has an outside annular ridge 11 containing an annular seal 12 and supporting ring 13. Associated with pipe end 10 is a slide-on bushing 14 that overlaps ridge 11 with a rear face or an annular mount 15 that extends inward. Bushing 14 can accordingly slide axially over the end 10 of the pipe.

An insert 16 has been inserted in bushing 14. The cylindrical section of insert 16 that constitutes an actual sealing surface also has an annular seal 12' and supporting ring 13'. Insert 16 can be connected, welded for example, to the end, not illustrated, of another pipe 10'.

Both slide-on bushing 14 and insert 16 have an outside annular ridge 17 and 18 respectively. Ridges 17 and 18 are overlapped by lateral flanges 19 that are an integral part of cups 20, which are held together by a multipart clip that can be secured with a tensioning-lever closure. Since the design of the closure and cups is generally known, these structures will neither be described nor illustrated in detail herein.

Annular mount 15 has four diametrically opposed bores 21. If contamination settles between annular mount 15 and annular ridge 11 after a long period of operating the device in a very dirty and dusty environment, it can be removed by rotating the pipe end 10 and slide-on bushing 14 together and at least slightly separating the two parts axially to generate an axial force that forces any contamination in the vicinity of one of the bores 21 into the bore. This process is augmented by the inside edges of bores 21, which will break up any layer of dirt that has already settled in.

Another advantage of bores 21 is that they will facilitate the employment of a pull-off tool if necessary. A pull-off tool of this type has pins that extend through bores 21 and engage the annular surface of ridge 11 while another section of the tool engages the outside of slide-on bushing 14. When, as occasionally occurs, it is difficult to slide bushing 14 over the end 10 of the pipe by hand, this operation can easily be performed with the pull-off tool.

Bores 21 extend away from the central longitudinal axis. The actual orientation is indicated only with respect to the bore 21 represented by the broken lines near the center of the FIGURE. The bores extend into a cylindrical surface in the vicinity of the bores at an angle opposed to one of the two possible directions of rotation in such a way the bottom edge of a bore in the drawing as at an obtuse angle of about 70° to thee radial plane that constitutes the plane of rotation. This edge accordingly functions as a contact edge for scraping the contaminants from the rear face of annular ridge 11 consequent to an appropriate relative rotation, with the angle of inclination of a bore automatically conveying the contamination outward.

Bores 21 can also be oriented in different directions if necessary, with some slanting toward one and some toward the other direction of rotation.

It will be appreciated that the instant specification and claims are set forth by way of illustration and not limitation, and that various modifications and changes may be made without departing from the spirit and scope of the present invention.

What is claimed is:

1. A device for connecting the ends of two pipes, comprising: an insert connectable to one pipe end and a bushing slidably and rotatably received over the end of another pipe having an annular ridge and which is configured to slidably and rotatably receive the insert, the bushing having an annular mount at a rear face at the end away from the insert and extending radially inwardly to overlap the annular ridge on said another pipe end, wherein the annular mount has at least one throughbore therein opening onto the annular ridge for removing particles of contamination on the annular ridge when the bushing is rotated relative to the annular ridge.

2. The device as in claim 1, wherein the annular mount has a radial extent and the diameter of at least one throughbore extends over at least a major portion of the radial extent of the annular mount.

3. The device as in claim 1, wherein the at least one throughbore is a slot.

4. The device as in claim 2, wherein the at least one throughbore is a slot.

5. The device as in claim 1, wherein the bushing has an axis of rotation and at least one throughbore has a central axis which extends at an acute angle to the axis of rotation.

* * * * *